United States Patent [19]

Eckmann et al.

[11] Patent Number: 5,446,972
[45] Date of Patent: Sep. 5, 1995

[54] CONTROL ROD DRIVE LENGTH MEASUREMENT TOOL

[75] Inventors: Thomas R. Eckmann, Killen, Ala.; Edward W. Saxon; Frank Ortega, both of San Jose, Calif.; Bettadapur N. Sridhar, Cupertino, Calif.

[73] Assignee: General Electric Company, Schenectady, N.Y.

[21] Appl. No.: 228,777

[22] Filed: Apr. 18, 1994

[51] Int. Cl.$^6$ ............... G21C 17/017; G01B 5/02
[52] U.S. Cl. ............................. 33/833; 33/502; 376/258
[58] Field of Search ............... 33/833, 832, 502, 626, 33/545, 549; 376/258

[56] References Cited

U.S. PATENT DOCUMENTS

| | | | |
|---|---|---|---|
| 3,319,395 | 5/1967 | Marconi | 33/832 |
| 3,475,825 | 11/1969 | Creek et al. | 33/502 |
| 3,475,826 | 11/1969 | De Hart et al. | 33/549 |
| 3,975,828 | 8/1976 | Calcatema et al. | 33/502 |
| 4,048,009 | 9/1977 | Weilbacher | 33/502 |
| 5,112,566 | 5/1992 | Butzen et al. | 376/258 |

Primary Examiner—Christopher W. Fulton
Attorney, Agent, or Firm—James E. McGinness

[57] ABSTRACT

A tool for checking the length of a control rod drive measured from the top of the control rod drive flange to the end of the uncoupling rod. The tool is a GO—NO—GO gauge with tight tolerance. The top of the tool supports a gage which has an arm that pivots about an axis parallel to the tool axis. The arm has a stepped notch with a predetermined height equal to the length tolerance range (e.g., 0.0625 inch). The length is considered acceptable when the gage is rotated and the first edge of the stepped notch on the arm just clears the end of the uncoupling rod but the second edge stops the gage from pivoting any further. The length is not acceptable if the first edge of the stepped notch on the arm abuts the uncoupling rod, preventing the gage from pivoting any further, or if the gage misses the uncoupling rod entirely.

20 Claims, 6 Drawing Sheets (PRIOR ART)
FIG. 1

CONTROL ROD DRIVE LENGTH MEASUREMENT TOOL

FIELD OF THE INVENTION

This invention relates generally to maintenance of a control rod drive of a boiling water reactor. Specifically, the invention relates to tools for inspecting a control rod drive during a maintenance operation.

BACKGROUND OF THE INVENTION

Figure 1:
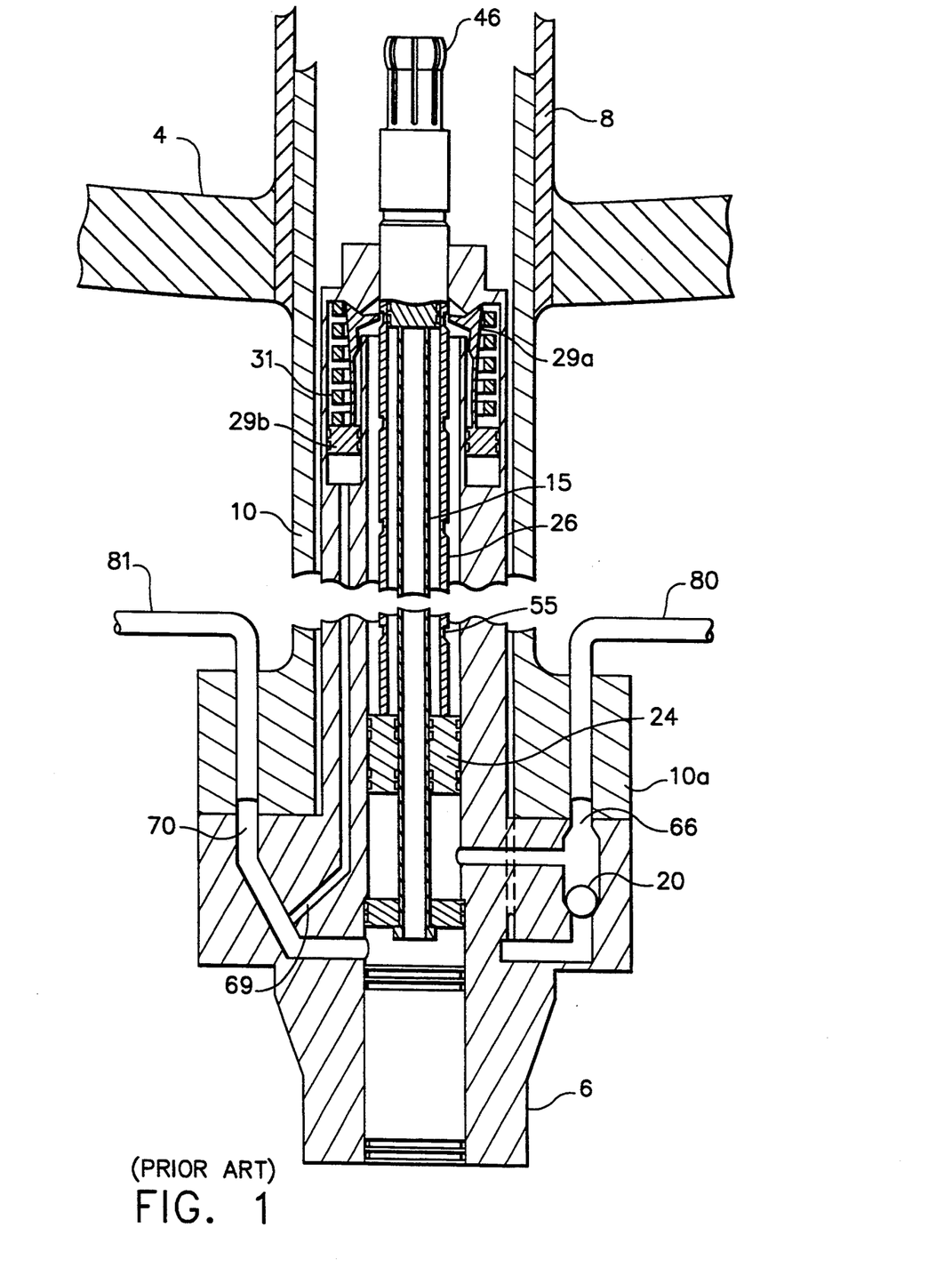
FIG. 1 is a sectional schematic of a conventional CRD installed in an RPV.

Control rod drives (CRDs) are used to position control rods in boiling water reactors (BWRs) to control the fission rate and fission density, and to provide adequate excess negative reactivity to shutdown the reactor from any normal operating or accident condition at the most reactive time in core life. Referring to FIG. 1, each CRD is mounted vertically in a CRD housing 10 which is welded to a stub tube 8, which in turn is welded to the bottom head of the reactor pressure vessel 4. The CRD flange 6 is bolted and sealed to the flange 10a of the CRD housing 10, which contains ports for attaching the CRD hydraulic system lines 80, 81. Demineralized water supplied by the CRD hydraulic system serves as the hydraulic fluid for CRD operation.

As shown schematically in FIG. 1, the CRD is a double-acting, mechanically latched hydraulic cylinder. The CRD is capable of inserting or withdrawing a control rod (not shown) at a slow controlled rate for normal reactor operation and of providing rapid control rod insertion (scram) in the event of an emergency requiring rapid shutdown of the reactor. A locking mechanism in the CRD permits the control rod to be positioned at 6-inch (152.4-mm) increments of stroke and to be held in these latched positions until the CRD is actuated for movement to a new position. A spud 46 at the top of the index tube 26 (the moving element) engages and locks into a socket at the bottom of the control rod. Once coupled, the CRD and control rod form an integral unit which must be manually uncoupled by specific procedures before a CRD or control rod may be removed from the reactor.

When installed in the reactor, the CRD is wholly contained in housing 10. The CRD flange 6 contains a withdraw port 70 and an insert port 66 with an integral two-way check valve (with a ball 20). For normal drive operation, drive water is supplied via an associated hydraulic control unit (HCU) to the insert port 66 for drive insertion and/or to withdraw port 70 for drive withdrawal. For rapid shutdown, the check valve directs external hydraulic pressure or reactor pressure to the underside of drive piston 24. When higher than the external hydraulic pressure, reactor pressure is admitted to the two-way check valve from the annular space between the CRD and a thermal sleeve (not shown) through passages in the CRD flange, called scram vessel ports.

Figure 2:
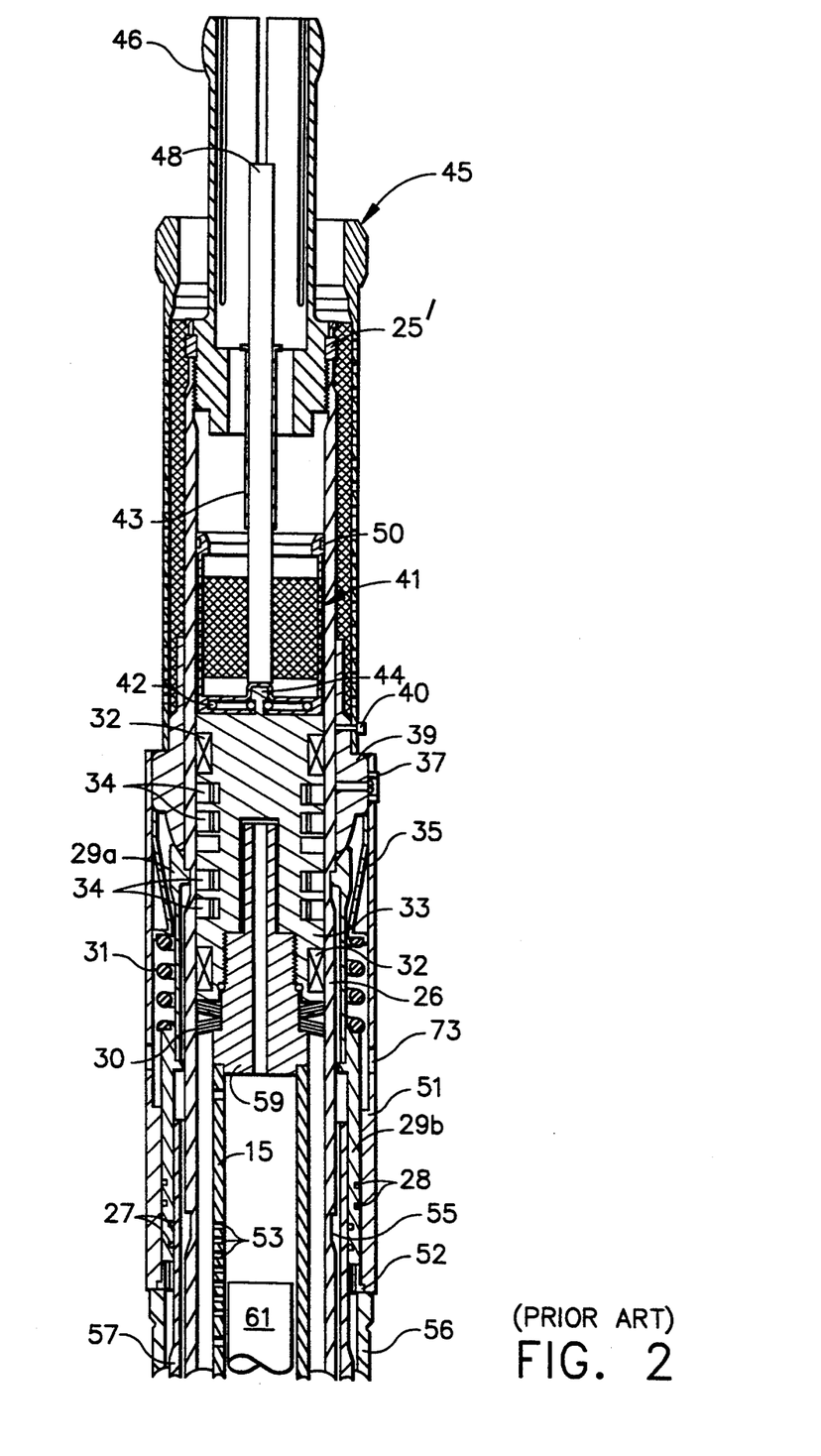
FIG. 2 is a sectional view of the upper portion of a conventional CRD.

Referring to FIG. 2, the CRD further comprises an inner cylinder 57 and an outer tube 56, which form an annulus under a collet piston 29b through which water is applied to the collet piston to unlock index tube 26. A collet housing 51 (which is part of outer tube 56) is provided with ports 73 to permit free passage of water from the clearance space between the outer diameter of index tube 26 and the inner diameter of inner cylinder 57 and the inner diameter of collet housing 51. The bottom of collet piston 29b normally rests against a spacer 52 in the upper portion of the annular space. Grooves in the spacer permit the passage of water between the bottom of the collet piston 29b and the passage area within the cylinder, tube and flange.

The locking mechanism consists of collet fingers 29a, collet piston 29b, barrel 35, guide cap 39, and collet spring 31. The mechanism is contained in the collet housing 51 portion of outer tube 56 and is the means by which index tube 26 is locked to hold the control rod at a selected position.

The collet assembly consists of a collet piston 29b fitted with two expansion piston seal rings 28 and two contraction piston seal rings 27, six fingers 29a and a retainer (not shown) and is set into a bore in the collet housing 51. In addition, a spring 31, barrel 35 and guide cap 39 complete the components installed in the collet housing 51.

Guide cap 39 is held in place above the collet by three plugs 37 which penetrate the upper end of collet housing 51, and which are held in place by fillister-head screws. It provides a fixed camming surface to guide collet fingers 29a upward and away from index tube 26 when unlocking pressure is applied to collet piston 29b. Barrel 35 is installed below guide cap 39 and serves as fixed seat for collet spring 31.

The collet mechanism requires a hydraulic pressure greater than reactor pressure to unlock for CRD-withdraw movement. A preload is placed on collet spring 31 at assembly and must be overcome before the collet can be moved toward the unlocked position. For control rod withdrawal, a brief insert signal is applied to move index tube 26 upward to relieve the axial load on collet fingers 29a, camming them outward against the sloping lower surface of index tube locking notch 55. Immediately thereafter, withdraw pressure is applied. In addition to moving index tube 26 downward, this pressure is at the same time applied to the bottom of collet piston 29b to overcome the spring pressure and cam the fingers 29a outward against guide cap 39. When the withdraw signal ceases, the spring pressure forces the collet downward so that fingers 29a slip off guide cap 39. As index tube 26 settles downward, collet fingers 29a snap into the next higher notch and lock. When collet fingers 29a engage a locking notch 55, collet piston 29b transfers the control rod weight from index tube 26 to the outer tube 56.

Unlocking is not required for CRD insertion. The collet fingers are cammed out of the locking notch as index tube 26 moves upward. The fingers 29a grip the outside wall of index tube 26 and snap into the next lower locking notch for single-notch insertion to hold index tube 26 in position. For scram insertion, index tube 26 moves continuously to its limit of travel during which the fingers snap into and cam out of each locking notch as index tube 26 moves upward. When the insert, withdraw or scram pressures are removed, index tube 26 settles back, from the limit of travel, and locks to hold the control rod in the required position.

The drive piston 24 and index tube 26 are the primary subassembly in the CRD, providing the driving link with the control rod as well as the notches for the locking mechanism collet fingers. Drive piston 24 operates between positive end stops, with a hydraulic cushion provided at the upper end only. Index tube 26 is a nitrided stainless-steel tube threaded internally at both ends. The spud 46 is threaded to its upper end, while the head of the drive piston 24 is threaded to its lower end.

Both connections are secured in place by means of bands 25, 25' with tab locks.

There are 25 notches machined into the wall of index tube 26, all but one of which are locking notches 55 spaced at 6-inch intervals. The uppermost surfaces of these notches engage collet fingers 29b, providing 24 increments at which a control rod may be positioned and preventing inadvertent withdrawal of the rod from the core. The lower surfaces of the locking notches slope gradually so that the collet fingers cam outward for control rod insertion.

When a control rod is driven upward to its fully inserted position during normal operation or scram, the upper end of the piston head (not shown) contacts the spring washers 30 which are installed below the stop piston 33. Washers 30 and stop piston 33 provide the upper limit of travel for drive piston 24. The spring washers, together with the series of buffer orifices 53 in the upper portion of piston tube 15, effectively cushion the moving drive piston 24 and reduce the shock of impact when the piston head contacts the stop piston.

A stud 59 is welded to the upper end of tube piston 15. Stud 59 is threaded for mounting the stop piston 33. A shoulder on the stud, just below the threaded section, is machined to provide a recess for the spring washers 30. The stop piston 33 provides the seal between reactor pressure and the area above the drive piston. It also functions as a positive-end stop at the upper limit of drive piston travel. Seals 34 include an upper pair used to maintain pressure above the drive piston during CRD withdrawal and a lower pair used only during the cushioning of the drive piston at the upper end of the stroke. Two external bushings 32 prevent metal-to-metal contact between stop piston 33 and index tube 26.

Figure 3:
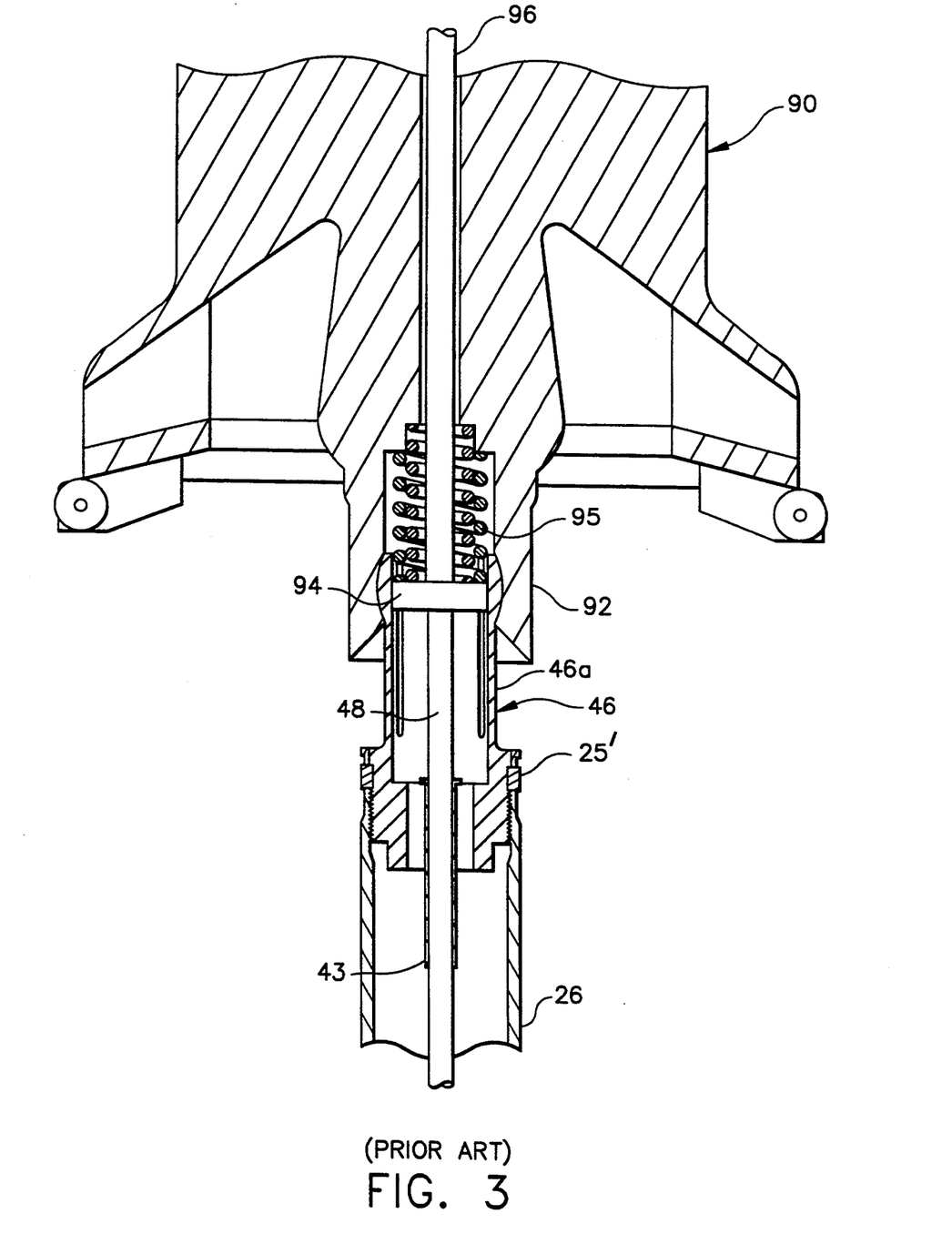
FIG. 3 is a sectional view of a conventional coupling of a control rod to a control rod drive.

As seen in FIG. 3, spud 46, which connects the control rod 90 and the CRD, is threaded onto the upper end of index tube 26 and held in place by locking band 25'. The coupling arrangement will accommodate a small amount of angular misalignment between the CRD and the control rod. Six spring fingers 46a permit the spud to enter the mating socket 92 on the control rod. A lock plug 94 then enters spud 46 from socket 92 and prevents uncoupling. An uncoupling rod 48 positions the control rod lock plug 94 such that it supports (i.e., opposes radially inward deflection of) the spud fingers 46a when the control rod and CRD are coupled.

The uncoupling rod 48 is welded to the flared end of a tube 43 such that a dimension of 1.125 inches exists between the top of rod 48 and the top end of spud 46. This is a critical dimension and must be maintained to ensure proper CRD and control-rod coupling. For this reason, uncoupling rods cannot be interchanged unless the critical dimension is verified. Tube 43 is slidably supported in the base of the spud at the upper end of the CRD (see FIG. 3).

Two uncoupling mechanisms are provided. The lock plug 94 may be raised against the return force of a spring 95 by an actuating shaft 96. The control rod, with lock plug 94 raised, may then be lifted from the CRD. The lock plug may also be raised from below to uncouple the CRD from below the reactor vessel. To accomplish this, an uncoupling tool is attached to the bottom of the CRD and used to raise piston tube 15 and uncoupling rod 48. When the control rod is in its "full-out" position, i.e., backseated position atop the guide tube (not shown), drive piston 24 is separated from piston head 15b by a distance of 2⅛ inches. Raising piston tube 15 and uncoupling rod 48 by 1⅛ inches lifts lock plug 94 out of the spud. The drive piston/index tube/spud assembly 24/26/46 is then withdrawn until the drive piston sits on the piston head 15b (i.e., a distance of 1 inch), thereby disengaging the spud from the control rod coupling socket 92 (i.e., uncoupling the control rod). The uncoupling tool is then lowered by 1⅛ inches to lower the control rod, assembly 24/26/46 and piston 15 together until piston head 15b is again backseated on the CRD ring flange 17.

SUMMARY OF THE INVENTION

The present invention is a tool for checking the overall length between the top of the CRD flange and the end of the uncoupling rod. This dimension is critical to assure the proper fitup of the reassembled CRD. The tool comprises an elongated tube with means for seating on the top surface of the CRD flange at one end and a "GO—NO—GO" gage for engaging the end of the uncoupling rod at the other end.

The length of the tool from the surface which abuts the top of the CRD flange to various transverse surfaces on the gage is calibrated before use. The tool is used to compare the length of an individual CRD with a standard length of a master calibration device which has been measured using a laser beam and calibrated to a known dimension accurate to a few thousandths of an inch. The master calibration device is used to adjust and set the length gage of the present invention.

The CRD length measurement tool is designed for rough treatment, but provides reasonable repeatability without being excessively heavy, i.e., the tool weighs less than 100 lbs. The tool is easily adjustable and maintains its adjustment so that it need not be compared to the standard after each CRD measurement. Further, the tool attaches easily to the CRD and rests upon it without any interference. The tool also provides for low probability of scratching the O-ring spacer plate.

The GO—NO GO feature provides a simple mechanism for ensuring that the CRD is within the required tolerance band. A pivoting gage is provided with two arms which pivot about an axis which is parallel to the tool axis. One arm is used to measure the lengths of CRDs having one standard length; the other arm is used to measure the lengths of CRDs having a different standard length. The arms are provided with stepped notches at respective lengthwise positions which are separated by a precalibrated distance, e.g., 0.4185±0.0005, which equals the difference between the length of one known CRD (i.e., 173.406 inches) and the length of another known CRD (i.e., 173.825 inches).

Each notch has a predetermined height equal to the CRD length tolerance range (e.g., 0.0625 inch). The length is considered acceptable when the gage is rotated and the first edge of the stepped notch on the corresponding arm just clears the end of the uncoupling rod but the second edge stops the gage from pivoting any further. The length is not acceptable if the first edge of the stepped notch on the corresponding arm abuts the uncoupling rod, preventing the gage from pivoting any further, or if the gage misses the uncoupling rod entirely. These conditions apply regardless of which one of the two types of CRD is being measured.

DETAILED DESCRIPTION OF THE PREFERRED EMBODIMENTS

Figure 4:
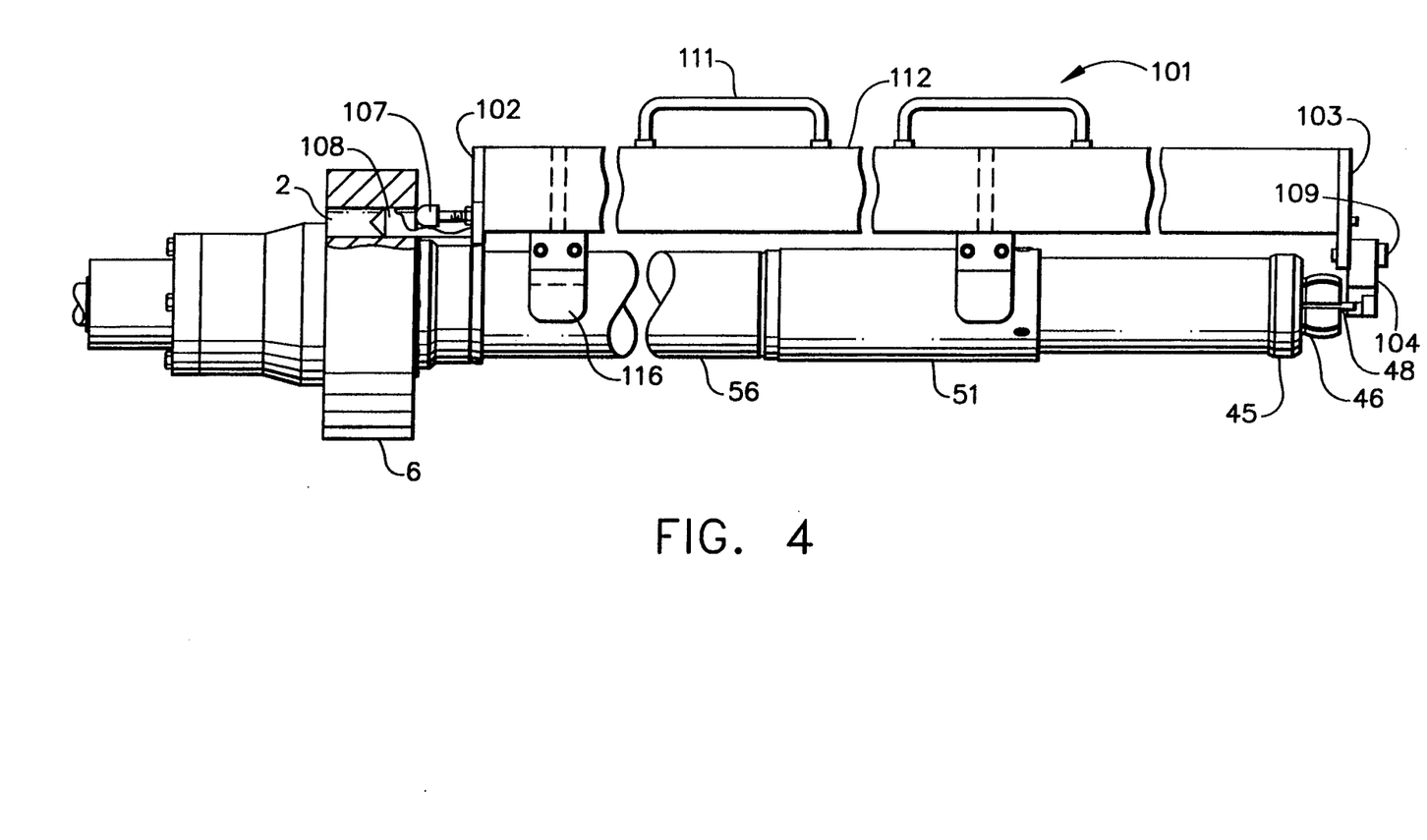
FIG. 4 is a side view of a tool in accordance with the preferred embodiment of the invention, in position to measure the length of a CRD with the spud in the backseated position.

The CRD length measurement tool in accordance with a preferred embodiment of the invention is a welded assembly 101 constructed as generally shown in FIG. 4. The assembly 101 comprises a stainless steel tube 112 of square cross section, having a width of 3 inches, a wall thickness of 0.12 inch and a length of 170.56 inches. An end plate 102 is welded to the bottom of tube 112; another end plate 103 is welded to the top of tube 112. Both end plates are perpendicular to the longitudinal axis of tube 112.

Figure 6:
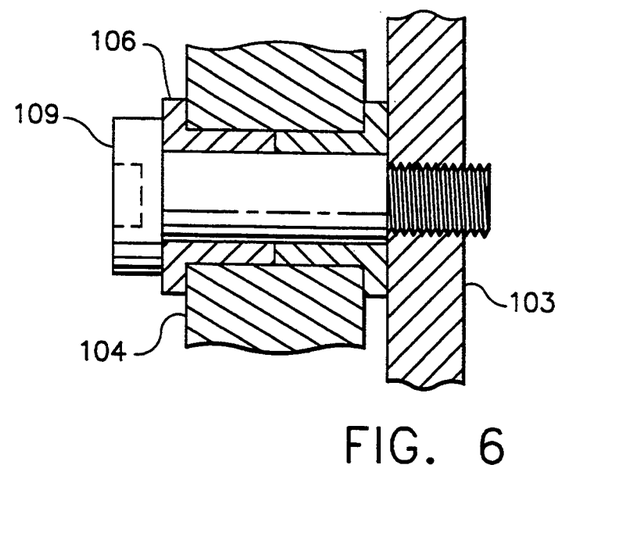
FIG. 6 is a sectional view showing that portion of the tool which pivotably supports the length measurement gage.

End plate 103 pivotably supports the gage 104 for checking the longitudinal position of the end of uncoupling rod 48. Referring to FIG. 6, gage 104 is pivotably mounted on end plate 103 via a pair of bushings 106 arranged end-to-end and a shoulder bolt 109. A threaded shaft portion of shoulder bolt 109 screws into a threaded bore in end plate 103. An unthreaded shaft portion of shoulder bolt 109 pivotably supports bushings 106, which pass through a circular cylindrical unthreaded bore 126 in gage 104. The bushing arrangement minimizes the tolerance stack-up and controls the play when gage 104 is rotated, allowing gage 104 to pivot about an axis parallel to the longitudinal axis of tube 112. A stop 110, welded on top of end plate 103, blocks rotation of gage 104 beyond a certain angle in either direction.

Figure 7A:
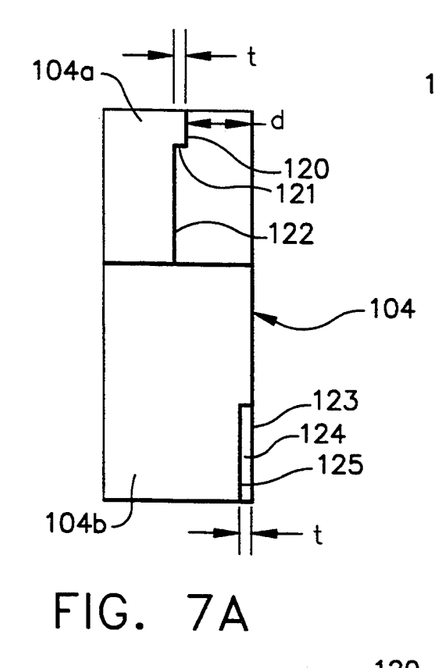
FIGS. 7A and 7B are side and bottom views respectively of the gage in accordance with the preferred embodiment.
Figure 7B:
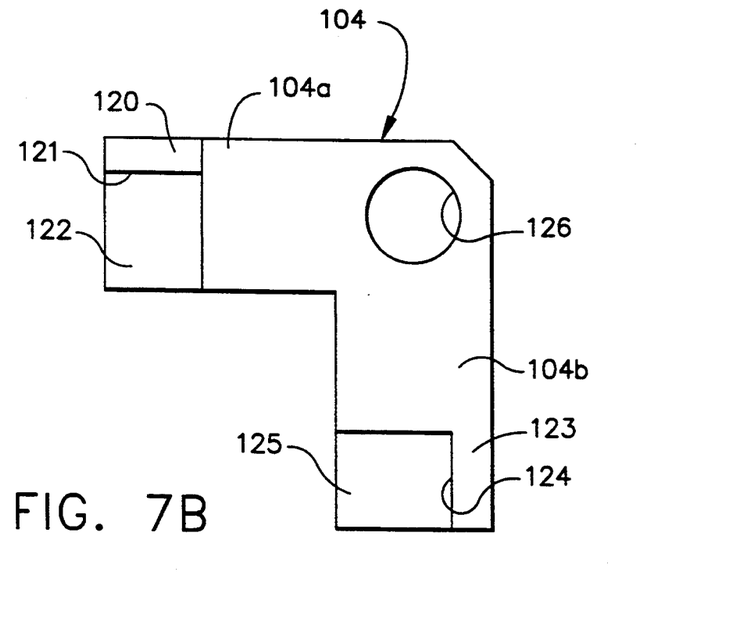

As shown in FIGS. 7A and 7B, gage 104 has two arms 104a and 104b which extend at a right angle relative to each other. However, the angle between the arms is not crucial to practice of the invention, so long as the uncoupling rod can be positioned to subtend the angle between the two arms.

In accordance with a preferred embodiment of the invention, each arm 104a, 104b of gage 104 is calibrated to check the CRD length of a different type of CRD. Arm 104a is calibrated to check CRDs of a type having a first standard length (e.g., 173.825 inches); arm 104b is calibrated to check CRDs of a type having a second standard length (e.g., 173.406 inches).

The key feature of gage 104 is the provision of two measuring surfaces (e.g., 120, 122 or 123, 125) which are used to determine whether the length from the top of the CRD flange to the end of uncoupling rod 48 of the respective CRD is within the prescribed tolerance. Each measuring surface is planar and perpendicular to the axis of rotation of gage 104, i.e., the axis of bore 126. Surfaces 120 and 122 are connected by an abutment surface 121 to form a notched step having a height such that surfaces 120 and 122 are separated by a distance t.

Similarly, surfaces 123 and 125 are connected by an abutment surface 124 to form a notched step having a height such that surfaces 123 and 125 are separated by the distance t. The distance d between surfaces 120 and 123 reflects the difference between the two standard CRD lengths. In accordance with the preferred embodiment, $t = 0.0625 \pm 0.0005$ inch and $d = 0.4185 \pm 0.0005$ inch.

Before gage 104 can be used to check the CRD length, the tube 112 must be correctly positioned relative to the CRD. The positioning means include an adjustable bolt 107, a pair of pins 108, a pair of saddles 105, and two pairs of plates 116, as described in detail below.

Figure 5A:
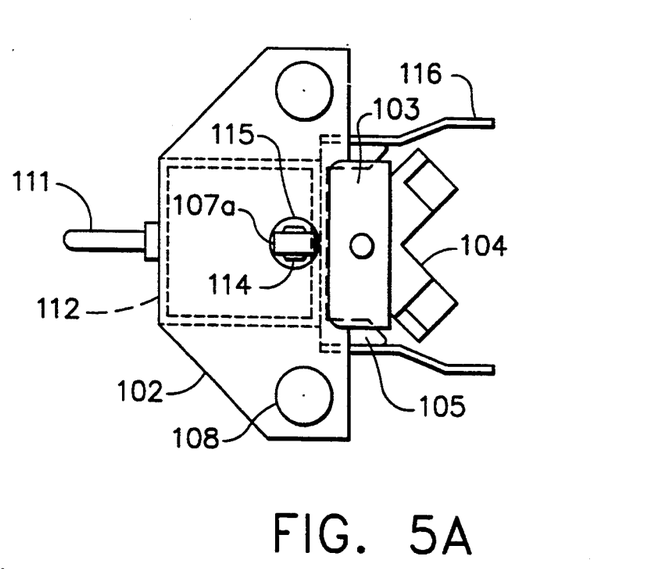
FIGS. 5A and 5C are bottom and top views of the tool in accordance with the preferred embodiment.
Figure 5B:
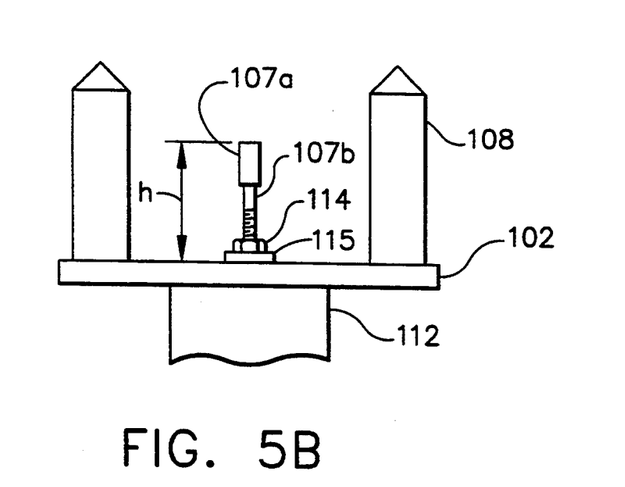
FIG. 5B is a front view of a bottom portion of the tool in accordance with the preferred embodiment.

Referring to FIG. 5B, end plate 102 has a threaded bore which receives a threaded shaft 107b of bolt 107. The head of bolt 107 takes the form of an anvil with a rounded abutment surface for contacting the CRD flange without scratching its surface and a pair of parallel flat side surfaces which facilitate screwing/unscrewing of bolt 107 by hand. The depth of penetration of adjustment bolt 107 is dependent on the position of an adjustment nut 114 which threads onto the threaded shaft of bolt 107. Nut 114 has an end face which bears against a washer 115 installed between nut 114 and end plate 102. Tightening of nut 114 against the washer locks bolt 107 into position with the desired penetration depth and consequently, with the desired distance h of the crest of anvil 107a from the end plate surface.

Height h determines the longitudinal position of tube 112, and consequently, gage 104, relative to the CRD flange 6. The anvil 107a can be raised or lowered relative to end plate 102 by rotating bolt 107 as desired, thereby adjusting height h. During calibration, the positions of the measuring surfaces on gage 104 relative to the crest of anvil 107a are checked against a standard length of a master calibration device which has been measured using a laser beam and calibrated to a known dimension accurate to a few thousandths of an inch. The longitudinal positions of the measuring surfaces relative to the standard length are suitably adjusted by rotation of bolt 107, causing the crest of anvil 107a to rise or fall as required.

The circumferential and radial positions of the bottom of tube 112 relative to the CRD are determined by a pair of alignment pins 108, which are configured to register in any adjacent two of the eight bolt holes 2 circumferentially distributed at equiangular intervals on the CRD flange 6. These bolt holes receive the bolts (not shown) which couple the CRD flange 6 to the flange 10a of the CRD housing 10. End plate 102 has a pair of throughholes which support the ends of alignment pins 108 with their axes parallel to the longitudinal axis of tube 112. Each alignment pin 108 is a circular cylinder with a conical tip for facilitating insertion of the pin in a corresponding bolt hole 2. The cylinder has a diameter slightly less than the diameter of bolt hole 2 to ensure that the alignment pins reside in the bolt holes without play.

Figure 5C:
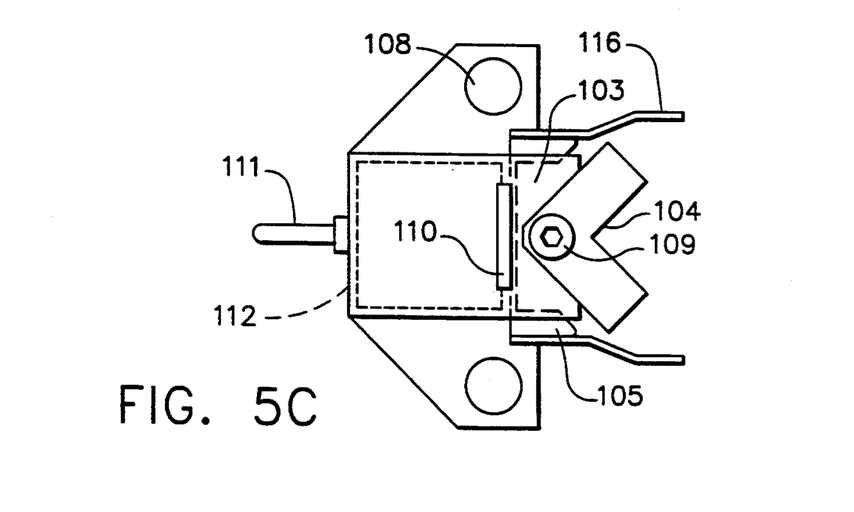

At two locations along the length of tube 112, the side facing the CRD has a respective saddle 105 bolted thereto. Each saddle has two arms with two bores to which a pair of plates 116 are bolted. The distance between opposing plates 116 increases as the plates extend away from the saddle and toward the CRD (see FIGS. 5A and 5C). The ends of plates 116 are separated by a distance which allows entry therebetween of a portion of the CRD. The upper pair of plates engage the collet housing 51; the lower pair of plates engage the outer tube 56 (see FIG. 4). The plates 116 fix the circumferential and radial positions of the upper portion of the tube 112 relative to the CRD.

The tool is designed to be stored on the floor in a horizontal position resting on the four plates 116. The radial distance of the tip of each plate 116 from the centerline of tube 112 is greater than the maximum radial distance of the gage 104 from the centerline. This ensures that the gage will not be impacted and damaged when the tool is placed down on the ground.

A pair of handles 111 are secured to tube 112 on the side opposite to the side to which plates 116 are attached. Handles 111 are used to lift the tool onto and off of the CRD. The customary practice is to check the length while the CRD is in a horizontal position. The position of the length measurement tool atop a horizontal CRD is depicted in FIG. 4.

To position the tool on the CRD, first the alignment pins 108 are respectively brought into registration with two bolt holes 2. Then the tool is laid to rest on the CRD with one pair of plates 116 engaging collet housing 51 and the other pair of plates 116 engaging the outer tube 56. The gage 104 should be positioned such that the end of the uncoupling rod 48 subtends the angle defined by arms 104a and 104b.

To compare the length of a CRD to a first standard length, gage 104 is rotated clockwise so that arm 104a approaches the end of uncoupling rod 48. If surface 122 passes over the uncoupling rod end and then surface 120 does not pass, i.e., the end of uncoupling rod 48 abuts and is stopped by abutment surface 121, then the CRD length is acceptable. If surface 122 does not pass over the end or if both surfaces 122 and 120 pass over the end, i.e., the uncoupling tool does not engage abutment surface 121, then the CRD length is unacceptable.

Similarly, to compare the length of a CRD to a second standard length, gage 104 is rotated counterclockwise so that arm 104b approaches the end of uncoupling rod 48. If surface 125 passes over the uncoupling rod end and then surface 123 does not pass, i.e., the end of uncoupling rod 48 abuts and is stopped by abutment surface 124, then the CRD length is acceptable. If surface 125 does not pass over the end or if both surfaces 123 and 125 pass over the end, i.e., the uncoupling tool does not engage abutment surface 124, then the CRD length is unacceptable.

The preferred embodiment of the CRD length measurement tool in accordance with the present invention has been disclosed for the purpose of illustration. Variations and modifications of the disclosed structure which do not depart from the concept of this invention will be readily apparent to mechanical engineers skilled in the art of CRD tooling. All such variations and modifications are intended to be encompassed by the claims set forth hereinafter.

We claim:

1. A tool for checking the length of a control rod drive having a flange and an uncoupling rod, comprising:
   rigid support means having a longitudinal axis;
   means for contacting a top surface of said flange;
   means for adjusting the longitudinal position of said contacting means relative to said rigid support means;
   gage means having first and second planar measuring surfaces which are mutually parallel and connected by a first abutment surface of predetermined height; and
   means for pivotably supporting said gage means on said rigid support means such that said gage means is pivotable about an axis parallel to said longitudinal axis, and said first and second measuring surfaces are perpendicular to said longitudinal axis.

2. The tool as defined in claim 1, wherein said predetermined height is equal to a tolerance range for said length of said control rod drive.

3. The tool as defined in claim 1, wherein said rigid support means comprises a tube, a first end plate connected at one end of said tube and a second end plate connected at the other end of said tube, said adjusting means being coupled to said first end plate and said pivotably supporting means being coupled to said second end plate.

4. The tool as defined in claim 3, wherein said first end plate has a threaded bore, and said adjusting means comprises a threaded shaft which threadably engages said threaded bore.

5. The tool as defined in claim 1, further comprising means for locking said adjusting means with said contacting means in a predetermined longitudinal position relative to said rigid support means.

6. The tool as defined in claim 1, wherein said contacting means has been adjusted by said adjusting means such that a first distance along said longitudinal axis between said contacting means and said first measuring surface is greater than a standard control rod drive length, and a second distance along said longitudinal axis between said contacting means and said second measuring surface is less than said standard control rod drive length.

7. The tool as defined in claim 1, further comprising means for registering with a pair of bolt holes in said flange of said control rod drive, said registering means being connected to said rigid support means.

8. The tool as defined in claim 1, wherein said adjusting means comprises a threaded shaft, and said contacting means comprises an anvil connected to an end of said threaded shaft.

9. The tool as defined in claim 1, further comprising means for supporting said tool with said longitudinal axis parallel to an axis of said control rod drive in a horizontal position.

10. A measuring tool comprising:
   rigid support means having a top end, a bottom end and a longitudinal axis;
   gage means having first and second planar measuring surfaces which are mutually parallel and connected by a first abutment surface of predetermined height; and
   means for pivotably supporting said gage means on said top end of said rigid support means such that said gage means is pivotable about an axis parallel to said longitudinal axis, and said first and second measuring surfaces are perpendicular to said longitudinal axis,
   wherein said first and second measuring surfaces are separated from said bottom end of said rigid support means by different distances measured along said longitudinal axis, and during pivoting of said gage means in a predetermined direction, a leading edge of said first measuring surface leads a leading edge of said second measuring surface.

11. The tool as defined in claim 10, wherein said predetermined height is equal to a tolerance range for a length of a component.

12. The tool as defined in claim 11, wherein said component is a control rod drive.

13. The tool as defined in claim 10, wherein said rigid support means comprises first and second support components and adjustable coupling means for coupling said first and second support components while allowing mutual longitudinal displacement relative to each other.

14. The tool as defined in claim 13, further comprising means for locking said adjustable coupling means with said first and second support components positioned to have a predetermined length.

15. The tool as defined in claim 13, wherein said adjustable coupling means comprises a threaded bore formed in said first support component and a threaded shaft connected to said second support component.

16. The tool as defined in claim 10, wherein said rigid support means comprises a tube and an end plate connected at one end of said tube, said pivotably supporting means being coupled to said end plate.

17. A method for checking the length of a control rod drive measured from an upper surface of a flange to an end of an uncoupling rod, said control rod drive having a longitudinal axis, comprising the steps of:

placing a first planar measuring surface perpendicular to said longitudinal axis at a first predetermined distance from a plane of an upper surface of said control rod drive flange;

placing a second planar measuring surface in parallel to said first measuring surface at a second predetermined distance from said plane of said upper surface of said control rod drive flange, said second predetermined distance being less than said first predetermined distance, said first and second measuring surfaces being separated by a predetermined length tolerance and having nonoverlapping areas of vertical projection onto said plane;

pivoting said first and second measuring surfaces in unison in a predetermined direction about an axis of rotation which is parallel to said longitudinal axis; and observing which of said first and second measuring surfaces crosses said longitudinal axis without intersecting said uncoupling tool.

18. The method as defined in claim 17, wherein said first and second measuring surfaces form parts of a notched step on a pivotable gage.

19. The method as defined in claim 17, wherein said first measuring surface leads said second measuring surfaces during said pivoting step, the length of said control rod drive being acceptable if said first measuring surface does not intersect said uncoupling rod and thereafter said second measuring surface does intersect said uncoupling rod during said pivoting step.

20. The method as defined in claim 17, wherein the longitudinal positions of said first and second measuring surfaces define the limits of a range of control rod drive lengths adequate for uncoupling a control rod from a control rod drive.

* * * * *